(12) United States Patent  
Khandros et al.

(10) Patent No.: US 11,055,126 B2  
(45) Date of Patent: Jul. 6, 2021

(54) MACHINE LEARNING COMPUTING MODEL FOR VIRTUAL MACHINE UNDERUTILIZATION DETECTION

(71) Applicant: ROYAL BANK OF CANADA, Montreal (CA)

(72) Inventors: Marat Khandros, Jersey City, NJ (US); Amirreza Oghbaee, Jersey City, NJ (US); Ali Syed, Jersey City, NJ (US); Kamran Pirasteh, Jersey City, NJ (US); Weitao Lin, Jersey City, NJ (US); Alexander Michael Krush, Jersey City, NJ (US); Jacob Alexander Abbott, Jersey City, NJ (US)

(73) Assignee: ROYAL BANK OF CANADA, Toronto (CA)

( * ) Notice: Subject to any disclaimer, the term of this patent is extended or adjusted under 35 U.S.C. 154(b) by 349 days.

(21) Appl. No.: 15/998,881

(22) Filed: Aug. 16, 2018

(65) Prior Publication Data

US 2019/0056969 A1 Feb. 21, 2019

Related U.S. Application Data

(60) Provisional application No. 62/546,368, filed on Aug. 16, 2017.

(51) Int. Cl.
*G06F 9/455* (2018.01)
*G06F 11/34* (2006.01)
(Continued)

(52) U.S. Cl.
CPC .......... *G06F 9/45558* (2013.01); *G06F 9/505* (2013.01); *G06F 9/5077* (2013.01); *G06F 11/301* (2013.01); *G06F 11/3447* (2013.01);

*G06F 11/3452* (2013.01); *G06F 16/258* (2019.01); *G06F 16/285* (2019.01); *G06K 9/6288* (2013.01); *G06N 3/0427* (2013.01); *G06N 5/046* (2013.01); *G06N 5/047* (2013.01);
(Continued)

(58) Field of Classification Search
None
See application file for complete search history.

(56) References Cited

U.S. PATENT DOCUMENTS

| 7,565,262 B2 * | 7/2009 | Yuan | G05B 23/0254 |
| | | | 702/180 |
| 10,747,568 B2 * | 8/2020 | Ahmed | H04L 41/0806 |
| 2011/0264609 A1 * | 10/2011 | Liu | G06N 20/00 |
| | | | 706/12 |

OTHER PUBLICATIONS

Haykin et al; Kalman Filtering and Neural Networks; John Wiley & Sons, Inc., 2001 (Year: 2001).*

(Continued)

*Primary Examiner* — Bing Zhao
(74) *Attorney, Agent, or Firm* — Norton Rose Fulbright Canada LLP

(57) ABSTRACT

Systems and methods are provided for detecting sub-optimal performance of one or more virtual computing platforms. Usage data representing user activity, and performance data representing computing hardware resource utilization, is collected from a plurality of virtual machines hosted on one or more virtual computing platforms. The usage data and performance data is then analyzed along with configuration data representing the hardware components of the computing devices operating the virtual computing platform.

20 Claims, 13 Drawing Sheets

(51) Int. Cl.
  *G06N 5/04*     (2006.01)
  *G06F 9/50*     (2006.01)
  *G06K 9/62*     (2006.01)
  *G06N 3/04*     (2006.01)
  *G06F 16/28*    (2019.01)
  *G06N 20/00*    (2019.01)
  *G06F 16/25*    (2019.01)
  *G06F 11/30*    (2006.01)
  *G06N 3/02*     (2006.01)

(52) U.S. Cl.
  CPC ..... *G06N 20/00* (2019.01); *G06F 2009/4557* (2013.01); *G06F 2009/45591* (2013.01); *G06K 9/62* (2013.01); *G06K 9/6217* (2013.01); *G06K 9/6218* (2013.01); *G06K 9/6221* (2013.01); *G06K 9/6223* (2013.01); *G06K 9/6255* (2013.01); *G06K 9/6298* (2013.01); *G06N 3/02* (2013.01)

(56)    References Cited

OTHER PUBLICATIONS

Chen et al; Bayesian Filtering: From Kalman Filters to Particle Filters, and Beyond; A Jurnal of Theoretical and Applied Statistics, 2003 (Year: 2003).*

* cited by examiner

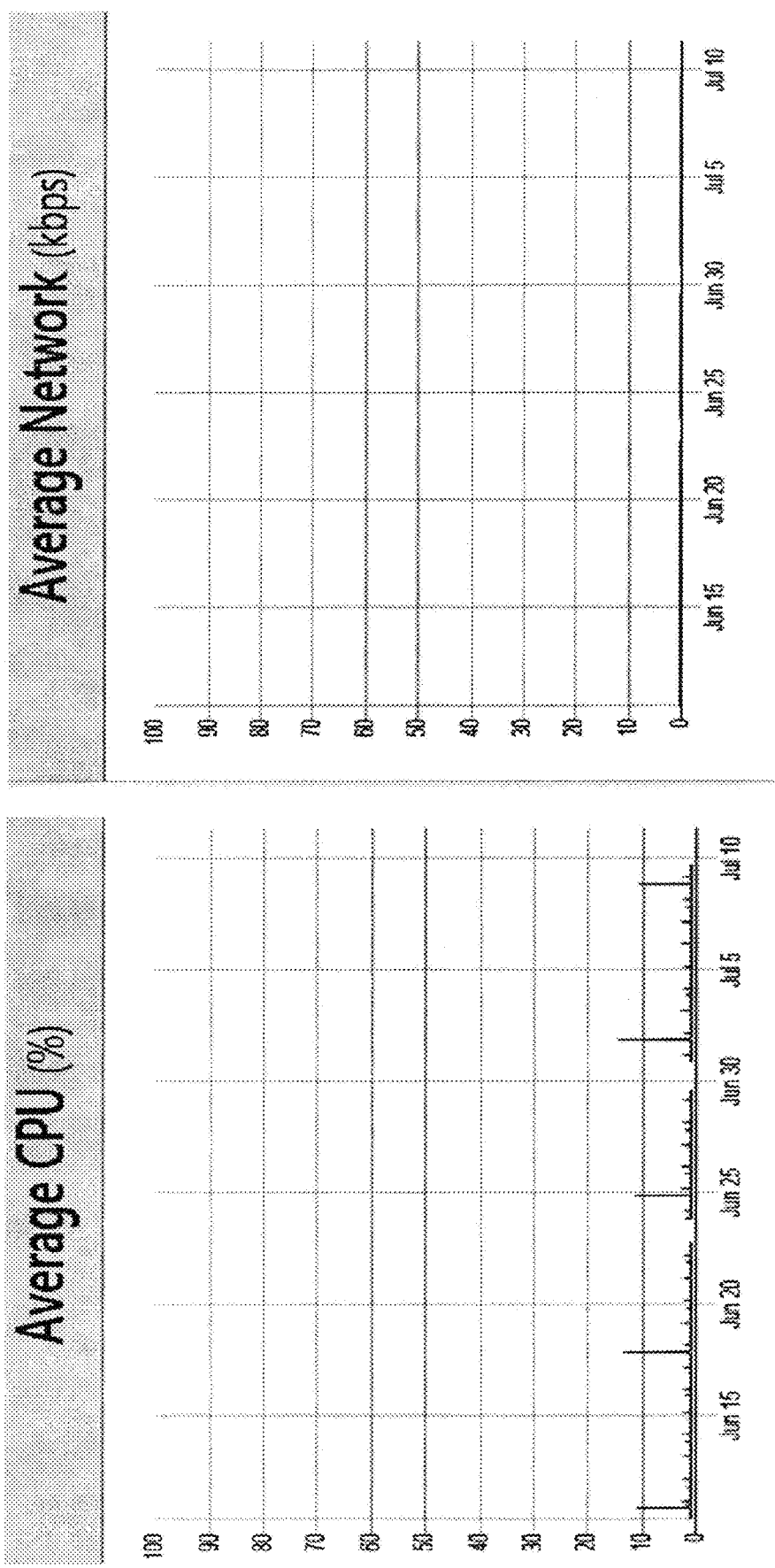

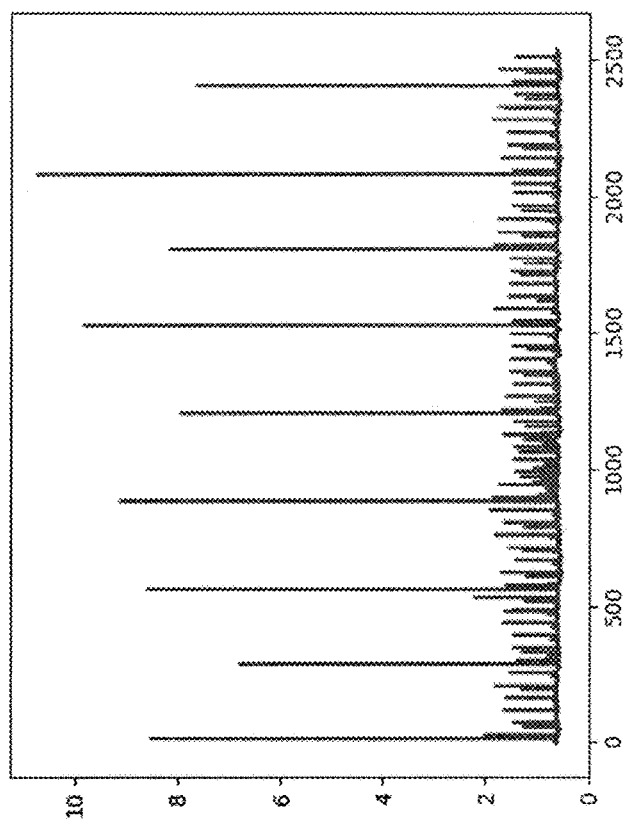
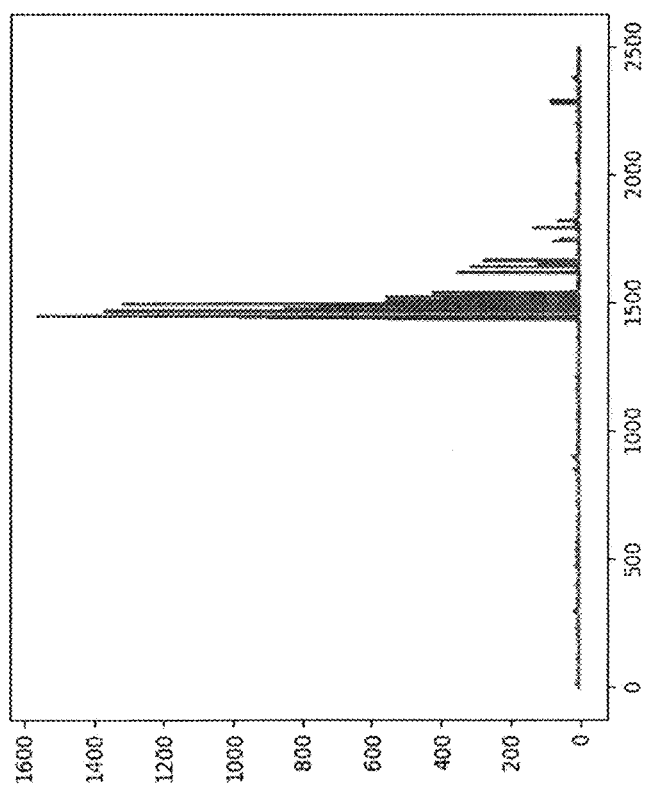
FIG. 12A
FIG. 12B

MACHINE LEARNING COMPUTING MODEL FOR VIRTUAL MACHINE UNDERUTILIZATION DETECTION

CROSS REFERENCE

This application is a non-provisional of, and claims all benefit, including priority to U.S. application No. 62/546,368, entitled "VIRTUAL MACHINE UNDERUTILIZATION DETECTOR", filed 16 Aug. 2017, incorporated herein by reference.

FIELD

The present disclosure generally relates to the field of virtual computing, and in particular, a platform for detecting underutilization of virtual machines.

INTRODUCTION

Virtual machine servers (also known as virtual computing platforms) host or run virtual machines which, in turn, run various operating systems in a full or pared down fashion, and act as full, or single use, computing platforms. This can allow, for example, multiple combinations of operating systems, build deployments, virtual workstations, virtual servers, and more to be provided by means of a single virtual machine server system.

Virtual machine servers can segment physical computing resources such as CPU cores, RAM memory blocks, and data storage resources into discrete environments through virtualization technology. As a result, multiple sets of "virtual components", each including the fundamental components of a server computer, may be created in a single virtual machine. When operated in concert, these sets of virtual components allow the simultaneous operation of different combinations of operating systems and software single set of physical hardware.

SUMMARY

Computational approaches are described herein for providing a data architecture that is distributed across a set of computing servers. The computing servers are utilized to each host one or more computing systems, in particular, where more than one computing system is hosted on a computing server (e.g., a physical server), the computing systems are run as virtual machines, which are emulations of computing systems.

Accordingly, a single host computer server is able to host a number of virtual machines, limited by the amount of computing resources available to the host computer server, including, for example, data storage (e.g., hard drive space), random access memory, processor cycles, among others. Virtual machines, in some cases, are managed by a hypervisor or supervisory component which can be utilized to modify allocations of computing resources across the virtual machines. For example, a host server may be hosting three virtual machines, and the host resources allocated may need to be spread across the host's operating system, as well as the three virtual machines.

Virtual machine performance (e.g., speed, capacity to handle requests) can be limited by the availability of resources. In particular, virtual machines are resource intensive as operating systems are duplicated, and many resources often remain in an un-provisioned state, or resources remain idle (e.g., awaiting requests). Accordingly, under-utilized virtual machines result in increased operating and capital expenditures. An improved approach for right-sizing virtual machine usage is thus desirable. Right-sizing can include identifying virtual machines for review, or in some embodiments, explicitly controlling the hypervisor to reduce virtual resource allocation, consolidate devices, or de-provision virtual machines. Conversely, right-sizing may also include increasing resource allocation for some virtual machines using the reductions from others (e.g., memory allocations, physical CPU resources, modifying allocations by weight, by capacity).

A specific improved approach is described in various embodiments that is adapted for improving convergence rates relating to expectation-maximization approaches for machine-learning based classification. An improved convergence rate serves to reduce the amount of computing power and time required to conduct machine-learning based classifications. Identifying virtual machine utilization as under-utilized, idle, normal, etc., is very challenging in large computing implementations, where there are potentially hundreds of thousands of virtual machines, whose usage varies across a duration of time (e.g., a snapshot a singular point in time would lead to an over classification of idle virtual machines). Accordingly, observations are made based on sensory data representative of operating or usage characteristics of the virtual machines, and similarly, these observations can be very numerous (e.g., hourly observations, across several months of usage). When combined with a large number of virtual machines, accuracy of identification is constrained by the computing resources allocated to conduct the identification.

As described in various embodiments, specific improvements are described that help alleviate the technical difficulties with identification through the usage of an improved modelling mechanism and method which potentially yields faster convergence of a model, despite maintaining an acceptable level of accuracy. Accordingly, sensory data representing CPU and memory usage, among other usage characteristics, can be received by the system which outputs a data structure showing a ranked set of virtual machines to either de-provision, reduce memory allocations, or to consolidate. In some further embodiments, a hypervisor controller then generates signals to control one or more hypervisors to initiate right-sizing operations, such as reducing allocations (underutilized), or de-activing virtual machines (idle), and may traverse the data structure to initiate operations based on a highest ranked virtual machine, moving onto a next highest, and so on.

In accordance with one aspect, there is provided a system for detecting sub-optimal performance of one or more virtual computing platforms, the system comprising: a middleware node configured to receive usage data and the performance data from one or more data sources; translate the usage data into a unified format; store the translated usage data in a memory; and transmit the usage data; a database node configured to receive the usage data and the performance data in the unified format from the middleware node and to store the usage data and the performance data in a data storage; a classification node configured to process the usage data and the performance data in the unified format in order to produce a utilization score and a classification for the one or more data sources and store the utilization score and the classification in a memory, the classification node comprising: a feature detection engine for detecting, collecting, interpreting, and quantifying features of usage data and performance data in the unified format and storing the features in a memory; a scoring engine for producing the utilization score for the one or more data sources based on at least one of the features stored in the memory by the feature detection engine, and storing the utilization score in the memory; and a classification engine assigning the one or more data sources into one or more classes based on the utilization score and at least one of the features of the one or more data sources stored in the memory.

According to another aspect, the system further comprises a user interface for transmitting an output of the feature detection engine, the scoring engine, or the classification engine to a user interface.

According to another aspect, the system further comprises the classification engine comprising: a predictive performance engine for producing a future utilization score based on the utilization score, the usage data, the performance data in the unified format, and the output of the classification engine; the classification node configured to store the future utilization score in the memory.

According to another aspect, the system further comprises the classification engine further comprising: a machine learning engine for analyzing at least one of the usage data, the performance data, the utilization score, the classification, or the usage data in order to produce a probability that the one or more virtual computing platforms will be sub-optimally configured at a future date.

According to another aspect, the system further comprises the classification node incorporating at least one machine learning package and at least one convolutional neural network operable to provide pattern recognition functionality.

In accordance with one aspect, there is provided a method for detecting sub-optimal performance of one or more virtual computing platforms, the method comprising: receiving usage data from the virtual computing platform; determining usage characteristics from the received usage data; retrieving configuration data pertaining to one or more virtual machine components; retrieving performance data and detecting features in the performance data that pertain to one or more components of the virtual computing platform; arranging the performance data according to performance metrics; merging the usage data and the performance data to with the retrieved configuration data to produce a combined dataset; applying at least one logical filter to the combined dataset; analyzing the configuration data and the detected features in the performance data to produce an efficient utilization threshold and an idleness threshold; comparing one or more of the detected features in the performance data with the efficient utilization threshold to produce a utilization score; comparing one or more of the detected features in the performance data with the idleness threshold to produce an idleness score.

In accordance with another aspect, the method further comprises: transmitting one or more of the usage data, the utilization score and the idleness score to a user interface.

In accordance with another aspect, the performance data contains at least one of CPU usage data, memory usage data, storage consumption data, and network traffic data.

In accordance with another aspect, the usage data contains at least one of one or more user login data, executed process history data, or executed process owner data.

In accordance with another aspect, the method further comprises: producing a future utilization score based on one or more of the utilization score, the usage data, the performance data in the unified format, and the output of the classification engine; storing the future utilization score in a memory; and transmitting the future utilization score to a user interface.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

BRIEF DESCRIPTION OF THE DRAWINGS

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 8A is a graph showing average CPU usage for an idle virtual machine utilization, according to some embodiments.

FIG. 8B is a graph showing average network usage for an idle virtual machine utilization, according to some embodiments.

FIG. 12A is a graph showing a modified weighted sum of CPU and network utilization for the normal virtual machine for processing in accordance with an embodiment of the improved approach.

FIG. 12B is a graph showing a modified weighted sum of CPU and network utilization for the idle virtual machine for processing in accordance with an embodiment of the improved approach.

DETAILED DESCRIPTION

Figure 1:
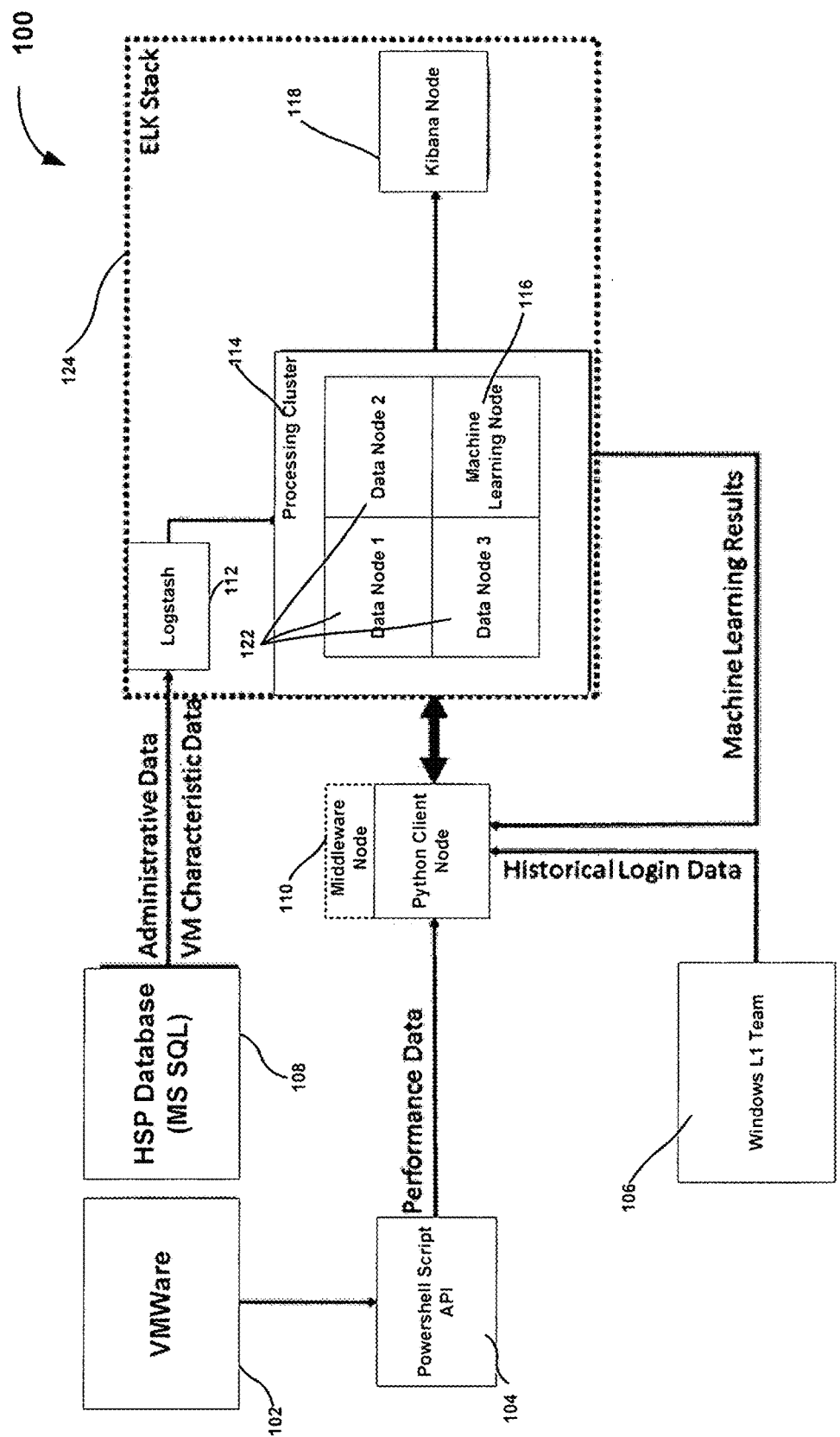
FIG. 1 is a block diagram depicting some components of an example system for detecting sub-optimal performance of one or more virtual computing platforms, according to some embodiments.

According to some embodiments, the system and method disclosed herein provide processes, methods, and corresponding systems and computer readable media to programmatically determine whether one or more virtual machines deployed by a virtual machine server are idle or in use, and whether the allocation of the computing resources of the virtual machine server is resulting in underutilization of those computing resources. Improving the usage rate/efficiency of virtual machine deployments is an important technical consideration in improving overall data center efficiency.

Most virtual machine servers (also known as virtual computing platforms) are equipped with a suite of management tools, which allow administrators to either increase or decrease resources allocated to the virtual machines, manage the number of inbound and outbound connections to and from each virtual machine, and conduct an automated basic setup that includes operating system, hardware and software configuration. However, such systems are not able to analyze and determine underutilized virtual machines or suboptimally configured virtual machines and to provide administrators with reports, and suggestions as to improved configuration schemes or to automatically implement such improved configuration schemes.

Embodiments provided herein facilitate more efficient and effective allocation of resources, and enable administrators or automated systems to re-allocate resources more quickly in order to maintain efficient and effective allocation. In some embodiments, a data architecture is utilized as a distributed system to assess virtual machine operating characteristics, harvesting through the use of data gatherers operating characteristics based on processor load, hard drive conditions, operating temperatures, memory usage (e.g., free memory, page file size), across one or more durations of time.

Data gatherers can include, for example, software tools that virtually track CPU usage for specific virtual machines. Other data gatherers can include hardware data gatherers, such as a temperature probe or fan speed sensor that detects spikes in computer temperature or fan speed (e.g., as an indirect proxy of heat), associating spikes based on tracked usage of a particular virtual machine being hosted on a physical server.

Embodiments relate to virtual machine optimization, and more specifically, to optimizing the use of computing resources by dynamically monitoring, assessing, consolidating, and/or de-commissioning virtual machines based on detected anomalies, resource utilization, and logical filters.

As virtual machine servers have gained popularity, and the complexity, power, and efficiency of computing hardware has continued to advance, many virtual environments have begun to encounter resource allocation problems. The use of the data gatherers is utilized to track resource usage at individual virtual machines, the data which is then encapsulated and stored in a data structure for retrieval and processing to assess overall aggregate operating conditions across a subset or all of the virtual machines. Processing the operating conditions allows for intelligent characterization and classification of the virtual machines.

A virtual machine is a software emulated computer that, like a physical computer, runs an operating system and applications. Comprising a set of specification and configuration files which allow the virtual machine to simulate the components of one or more physical computers, virtual machines are backed by the physical resources of at least one actual (physical) host computer (note: a virtual machine may operate within another virtual machine, etc., but at some point there must be a physical host computer. Virtual machines are further capable of virtualizing a full set of hardware resources, including a processor (or processors), memory (e.g., RAM), storage resources, and peripheral devices (e.g., keyboard). A hypervisor (or "virtual machine monitor" (VMM)), is a software element operating on a virtual machine server that provides the abstraction of a virtual machine.

Three properties are relevant when analyzing the environment created by a VMM: a) Equivalence™/Fidelity™, a program running under the VMM should exhibit a behavior essentially identical to that demonstrated when running on an equivalent physical computer; 2) Resource control/Safety, the VMM must be in complete control of the virtualized resources; 3) Efficiency/Performance, a statistically dominant fraction of machine instructions must be executed without VMM intervention.

Virtual machines can, themselves, be separated into three broad categories defined by the function provided by the virtual machine. First, system virtual machines (also "full virtualization VMs") can provide a substitute for a real machine. Full virtualization VMs can provide functionality needed to execute entire operating systems. A hypervisor may then allow the operating system to share and manage hardware as in a physical computer. This can allow for multiple environments which are isolated from one another, but exist on the same physical computer.

Second, process virtual machines are designed to execute computer programs in a platform-independent environment. In these cases, the virtual machine may emulate only those components of a particular hardware architecture and operating system which are essential to enable the proper operation of a particular computer program. Some process virtual machines, are designed to emulate different architectures and allow execution of software applications and operating systems written for another CPU or architecture (e.g., see PowerPC CPU based versions of WINE).

Third, operating-system-level virtualization allows the resources of a computer to be partitioned into "containers" via the operating system kernel's support for multiple isolated user space instances. This mode of operation (reminiscent of mainframe computer architecture) employs containers to create user environments that look and feel like physical computers from the perspective of end users.

An administrator overseeing the operation of a virtual machine server hosting a handful of virtual machines will have no issue determining when one of said virtual machines has become dormant. This will allow the administrator to de-commission the dormant virtual machine and, perhaps, re-allocate freed up resources to the remaining virtual machines in operation.

However, many virtual machine deployments now include thousands or even hundreds of thousands of virtual machines operating in one environment—this has introduced new challenges to information technology administration.

Traditionally, operating systems design assumes that each hard disk is local, and therefore reading from and writing to hard disks is fast and low cost. As a result, most operating systems generously use the disk to increase efficiency in a number of ways, such as caching, buffering, and logging. Virtual machines, however, typically employ segmented shared storage instead of assigning an individual disk to each virtual machine. As the number of virtual machines provided by a virtual machine server increases, this can lead to increased fragmentation (writing single files to non-sequential blocks on a hard disk), and since each read or write request in a virtual machine must be transmitted by the virtual machine server to a shared storage (typically a network connected RAID array), increasing the number of virtual machines also increases the amount of network traffic.

Often, easing access to computing capacity in the form of virtual machines, as Infrastructure as a Service (IaaS) clouds do, has been observed to cause a proliferation of barely utilized virtual machines; developers and users forget to de-commission virtual machines in order to return resources to the pool after the end of a project. As the number of underutilized (or unused) virtual machines increases, so does the load placed on administrators and on shared infrastructure such as storage, network infrastructure, and CPUs.

System administrators often employ rudimentary rules-and-notifications based virtual machine reclamation systems. For instance, a common policy is to automatically generate an alert when no user has interacted with a virtual machine for three consecutive months. The alert, which will include the identifier of the virtual machine, will be sent to one or more IT administrators who will then manually notify any persons responsible for the virtual machine that, unless there is some objection, the virtual machine will be de-commissioned. However, these systems require system administrators to take multiple actions and do not provide a means for identifying virtual machines which have been allocated more (or fewer) resources than required by the processing, storage, or networking load they place on the virtual machine server's physical hardware.

Accordingly, there is need for systems and methods for automatically determining idle or underutilized virtual machines in order to facilitate more optimal allocation of computing resources.

In some embodiments, the systems and methods disclosed herein may analyze whether or not a virtual machine is idle and may provide a score-based recommendation indicating whether or not decommissioning a particular virtual machine residing on a virtual machine server will result in more effective use of resources. The scores may be automatically included in a report presented to one or more administrators or other users via a user interface in order to enable re-configuration or de-commissioning of one or more virtual machines. In some embodiments, the scores may be incorporated into a report which may include recommendations for optimal re-configuration of virtual machines in order to make better use of virtual machine server resources.

In some embodiments, idle status may be determined through a combination of anomaly-detection processes and logical filters based on usage data, which may include login status, create time, and power status. Embodiments may also interpret various performance data related to a particular virtual machine, which may include various CPU, RAM memory, and storage consumption measurements (e.g., Processor (CPU or virtual CPU "vCPU") usage), memory (e.g., RAM, vRAM) usage, and storage (e.g., hard-disk, RAID, virtual disk, or cloud storage) usage/consumption along with network traffic for each virtual machine. Interpreting usage data and/or performance data according to the systems and methods described herein may produce recommendations for the resizing, re-configuration, or de-commissioning of virtual assets.

For example, performance data may reflect that a hypervisor of a particular virtual machine has not requested any hard disk writes, CPU processing cycles, or written any data to the RAM memory of the virtual machine server in three months, with the exception of those hard disk writes, processing cycles, and memory write required to boot the virtual operating system in the virtual machine. However, the usage data may reflect that there have been periodic, daily, boots and log-ins recorded by the virtual machine over the past three months.

This usage data and performance data pattern may be detected by the systems and methods described herein as being indicative of an high idleness score since the system may be configured to automatically boot and login periodically, but may not actually be in active use. This usage data and performance data pattern may also be detected by the systems and methods described herein, for instance by a scoring engine forming part of a machine learning node, as being indicative of a low utilization score. For example, a virtual machine producing such a score may, in fact, be configured to automatically perform some task on a daily basis. The low utilization score assigned by the scoring engine may indicate to administrators that the particular virtual machine may require fewer resources or may safely be consolidated with one or more other virtual machines running on the virtual machine server.

In some embodiments, usage data and performance may be collected by third party tools and may include records of the utilization of one or more virtual machines on one or more virtual machine servers (e.g., VMware™ Performance Data, Turbonomic™, Historic Login Data™ via Tanium™ and/or Windows™ L1 Team). Usage data and performance data may be collected at various time increments at least every hour, but may also be schedule for more frequent collection or may be collected automatically in response to an event (e.g., unexpected restart), in some embodiments.

In some embodiments, various configuration data pertaining to components of the virtual machine server itself may be collected from one or more data sources (e.g., from the virtual machine server itself or from an external data store such as a Hosting Service Provisioning (HSP) Database) and stored in one or more database nodes. Such configuration data may include, for example, CPU type and core count, total vCPU count, total vCPU core count and types, total memory, as well as administrative information such as application codes, listed process owner, application custodian data, and various create dates.

In some embodiments, if applicable, usage data may include, at a minimum, the most recent date and time that any user logged into each virtual machine in a pre-defined span of time.

In some embodiments, results may be displayed via a real-time dashboard. The displayed results may display metrics measuring how efficiently different app codes, (e.g., unique numerical codes assigned to various executable applications operating on one or more computers) are using their virtual machines. Additional dashboards may display efficiency by L4 Executive™. Communication of the outputs of the systems and methods described herein may provide administrators with the insight needed to destroy and resize virtual assets to increase efficiency and/or capture cost savings. Some embodiments may allow for the process of destroying and/or resizing/re-configuring virtual assets to be conducted by purely automated means in response to a particular virtual machine's utilization and idleness scores.

FIG. 1 is a block diagram depicting the components of an example system for detecting sub-optimal performance of one or more virtual computing platforms, according to some embodiments. In some embodiments, the detection of sub-optimal performance is fully automated and responsive to predictions based on received machine interpreted stimuli. Each component of the example system which performs a particular function may be referred to herein as a "node". Nodes may comprise multiple computer systems or multiple nodes may be executed by a single system. Further, multiple nodes may be combined in order to produce a node providing multiple functions.

In an embodiment, a middleware node 110 (here depicted, by non-limiting example, as a Python™ Client node) may serve as a middleware application program interface (API). The middleware node 110 may translate, re-organize, and/or communicate data collected from one or more data sources (e.g., PowerShell Script API 104, Windows™ L1 Team 106) and the processing cluster 114.

In some embodiments, a dedicated Python™ node serving as middleware node 110 may offer great flexibility in terms of data transmission and analysis. Raw performance and historical login data may be transmitted or stored by various data sources (e.g. 103, 106) in various formats which may be incompatible with one another. These data may be processed by middleware node 110 in, for example, Python, before transmission to the processing cluster 114. Processing cluster 114, may be described as the "heart" of ELK stack 124, and may work as a fast, reliable database which may be stored in a data store (e.g., on one or more database nodes 122). Performance data may also be obtained from one or more data gatherer sensory tools, including, for example, software tools that virtually track CPU usage for specific virtual machines. Other data gatherers can include hardware data gatherers, such as a temperature probe or fan speed sensor that detects spikes in computer temperature or fan speed (e.g., as an indirect proxy of heat), associating spikes based on tracked usage of a particular virtual machine being hosted on a physical server.

Pre-processed performance data may be merged with data coming from the HSP Database 108 in the processing cluster 114. By processing received usage data (which usage data may come from varying systems with different, potentially incompatible data formats) into an optimized, combined, unified dataset, middleware node 110 may improve performance of the system 100. The processing conducted by middleware node 110 may be of further importance as the systems and methods described herein may involve vast amounts of data which, if left in a non-unified, non-optimized format, may significantly decrease the computing performance of any computing device seeking to execute the systems and methods described herein. The middleware node 110 may then cause processed usage data to be written to a data storage which may be one or more database nodes 122

In some embodiments, there may be 3 (as a non-limiting example) dedicated database nodes 122 configured as data storage to store these data and their replicas. Another node, which may be machine learning node 116, which may form part of a classification node, may be used for applying the machine learning process to performance data. One or more plugins (e.g., Elasticsearch™ X-Pack plugin) may be used for this purpose.

In some embodiments, the machine learning process executed by machine learning node 116, functioning in its classification node capacity, may read in the 1-dimensional time series and detecting the local features of each metric such as specific spikes or waves. This may be performed by function of a feature detection engine forming part of the machine learning node 116. Then, the feature detection engine of the machine learning node 116 may aggregate some or all of these detected features as pattern recognition data to classify virtual machines based on their performance consumption patterns.

In some embodiments, pattern recognition data may be stored in machine learning node 116 where it may be retrievable by the middleware node 110. Having a dedicated middleware node 110 node may enable the system 100 to merge some or all of the results and make a final real-time decision regarding the utilization and idle status of each virtual machine.

In some embodiments, another node of ELK stack 124 may be used to host a user interface node 118, depicted in FIG. 1 as the "Kibana" node. This user interface node 118 may function to present the results of the system's operation via a user interface for data visualization. The final results of the system's operation may be illustrated in two Kibana dashboards the Executive Reporting Dashboard and the VM Utilization/Cost Dashboards.

In some embodiments, the Executive Reporting Dashboard may be configured to be easily used by higher level managers and may allow for monitoring of the overall utilization of all virtual machines. In some embodiments, the VM Utilization/Cost Dashboard may be configured to be easily used by application team managers and may enable them to more efficiently use, deploy, configure, re-configure, and/or de-commission virtual machines.

In some embodiments, an automation node may be included. The automation node may automatically collect and process data on a periodic basis (or may receive data in response to certain events) and may automatically update prediction results to reflect newly received data or in response to machine learning functionality.

Watcher mechanisms (e.g., lightweight, always active "daemon" computer processes) may be configured to automatically provide notification (e.g., alert by email or SMS) when certain conditions are trigged (e.g., a new virtual machine has been designated as idle and/or underutilized). For example, a daemon process may operate to detect when a particular condition established by a logical filter is fulfilled (e.g., a condition requiring notification to be sent if a virtual machine has not utilized more than 80% of its vCPU processing power for more than 1 hour for a period of 30 consecutive days).

Figure 2:
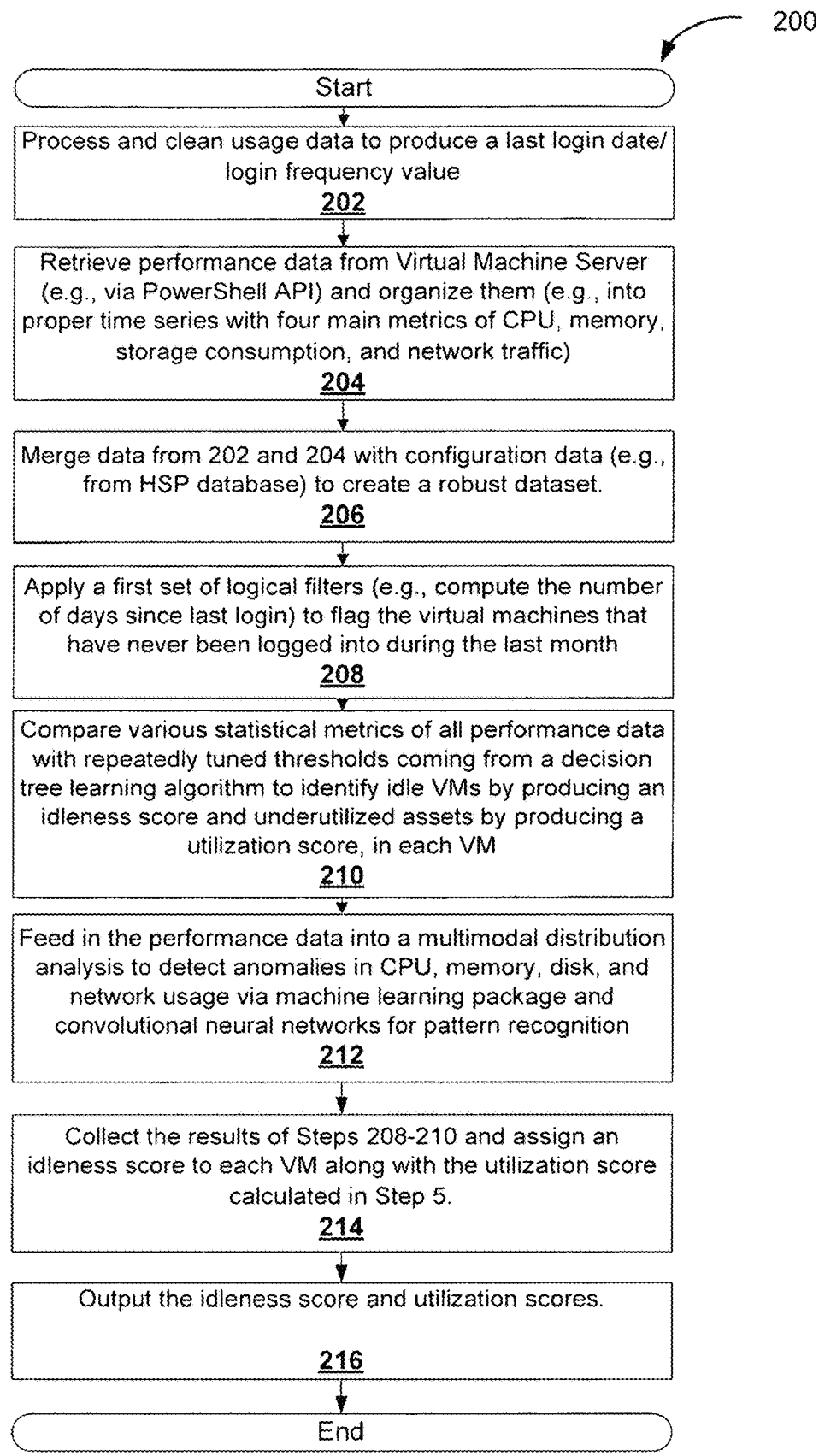
FIG. 2 is a flow chart depicting an example method for detecting sub-optimal performance of one or more virtual computing platforms according to some embodiments.

FIG. 2 is a method diagram depicting operational steps in an example method of detecting sub-optimal performance of one or more virtual computing platforms according to some embodiments.

At 202, usage data may be processed and cleaned up (e.g., standardized according to a unified format) to produce a "last login date" and/or a "login frequency" value.

At 204, performance data may be retrieved from a virtual machine server (e.g., via PowerShell API) and organized (e.g., into a proper time series measuring four main metrics of CPU, memory, storage consumption, and network traffic).

At 206, usage data from 202 and performance data from 204 may be combined with configuration data, which may include data about the particular hardware components or configuration of the virtual machine server. The combined data may transform one or more elements of the usage data and performance data to create an optimized dataset having multiple values in a uniform, sequential format.

At 208, a first set of logical filters may be applied. Logical filters may include, for example, computing the number of days that have elapsed between the most recent login, or calculating how many subsets of data contain periods of 3 or more consecutive days without a login event).

At 210, various statistical metrics of all performance data may be compared with repeatedly tuned thresholds from one or more decision tree learning processes. The process may identify individual virtual machines and/or idle virtual machines.

At 212, the performance data may be interpreted according to a multimodal distribution analysis which may detect anomalies in various performance data metrics (e.g., CPU, memory, disk, network usage). This process may be performed by one or more machine learning packages and/or one or more convolutional neuro networks for pattern recognition.

At 214, the results of steps 208-202 (e.g., the flagged virtual machines, identified idle virtual machines, and utilization scores), are collected, associated with each applicable virtual machine, and stored in a memory.

At 216, the idleness scores and utilization scores are transmitted to an output device (e.g., a first dashboard catered toward higher level managers to overview the overall utilization, efficiency and size of all VMs, and a second dashboard, utilization/cost dashboard, tailored for application team managers.

The method can be performed through computer implementation by components of a system 100, and example of which is provided in FIG. 1.

Figure 3:
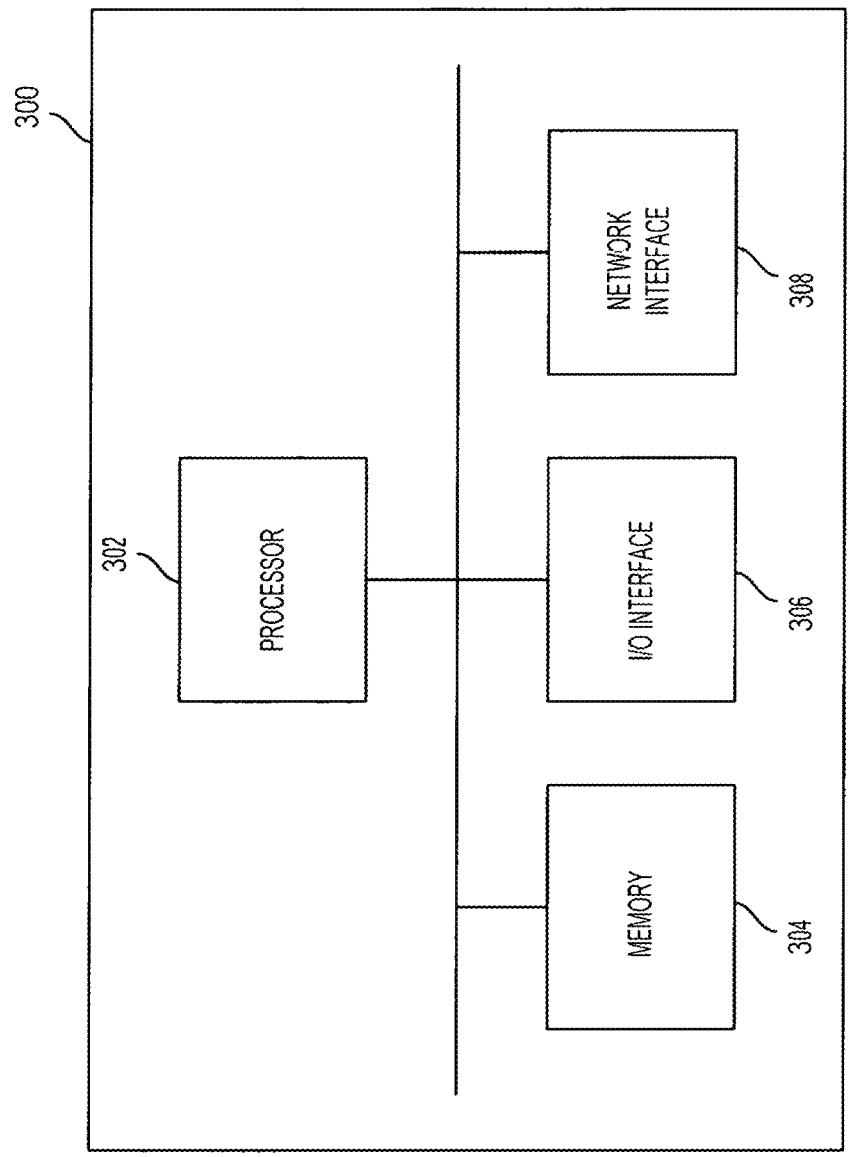
FIG. 3 is a schematic diagram of a computing device, according to some embodiments.

FIG. 3 is a schematic diagram of computing device 300, exemplary of an embodiment. As depicted, computing device 300 includes at least one processor 302, memory 304, at least one I/O interface 306, and at least one network interface 308.

Each processor 302 may be a microprocessor or microcontroller, a digital signal processing (DSP) processor, an integrated circuit, a field programmable gate array (FPGA), a reconfigurable processor, a programmable read-only memory (PROM), or any combination thereof.

Memory 304 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 306 enables computing device 300 to interconnect with one or more input devices, such as a keyboard, mouse, camera, touch screen and a microphone, or with one or more output devices such as a display screen and a speaker.

Each network interface 308 enables computing device 300 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 300 may be operable to register and authenticate users (using a login, unique identifier, and password for example) prior to providing access to applications, a local network, network resources, other networks and network security devices. Computing devices 300 may serve one user or multiple users.

Figure 4:
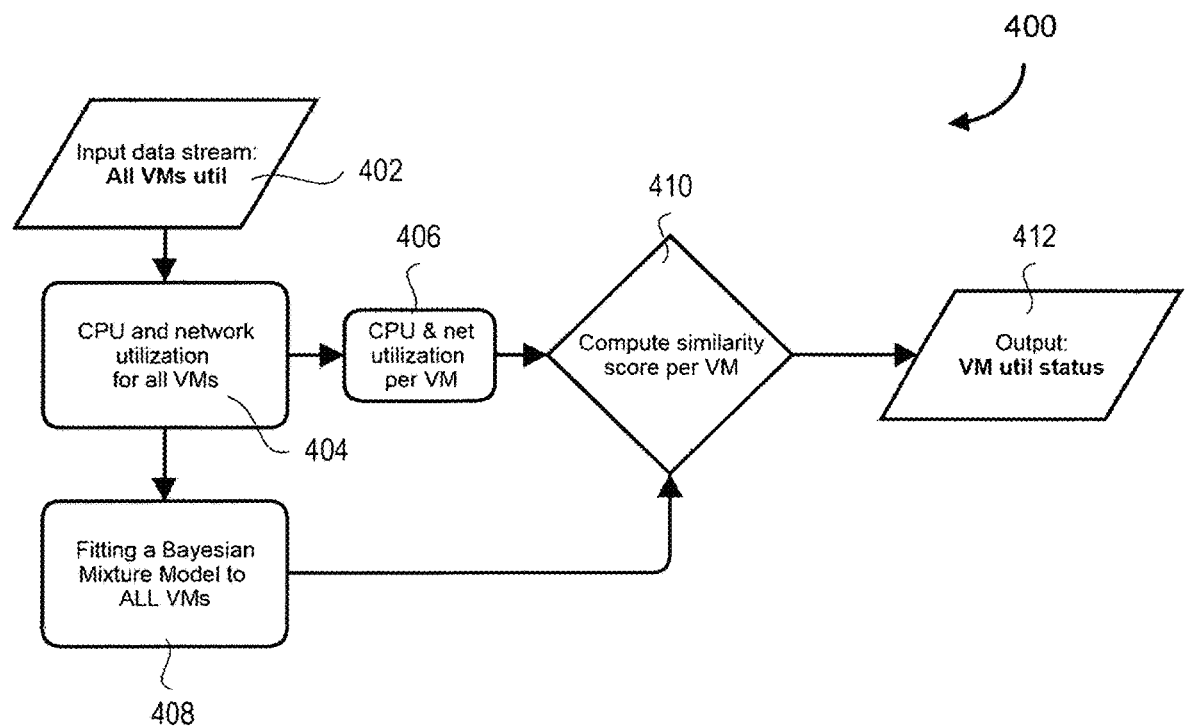
FIG. 4 is an example method diagram showing a method for assessing virtual machine utilization, according to some embodiments.

FIG. 4 is an example embodiment of a method for assessing virtual machine utilization, according to some embodiments. In particular, FIG. 4 is an example data flow, which is improved upon in some embodiments as described further below in FIG. 6.

In method 400, an input data stream is received at 402 which includes utilization data sets for all virtual machines being managed in a data center. The entire dataset (all virtual machine utilization data) is provided to the system. Then, in order to identify the influencers, i.e. virtual machines, the utilization data is categorized on a per virtual machine basis and streamed to the system as an input dataset.

In particular, virtual machine performance data is provided as the input. Then, a multimodal distribution analysis is used to detect anomalies in CPU, and network usage.

At 404, CPU and network utilization information is assessed and parsed, and split up into data for each virtual machine at 406. To be specific, a weighted sum of processor and network utilization is pushed into a machine learning mechanism. A Bayesian mixture model is applied to the aggregate data set at 408.

At 410, a computed similarity score for each virtual machine is generated. With the aid of the similarity score, virtual machine statuses are identified. At 412, the system generates a list of VMs where their utilization data were detected anomalous.

Figure 5:
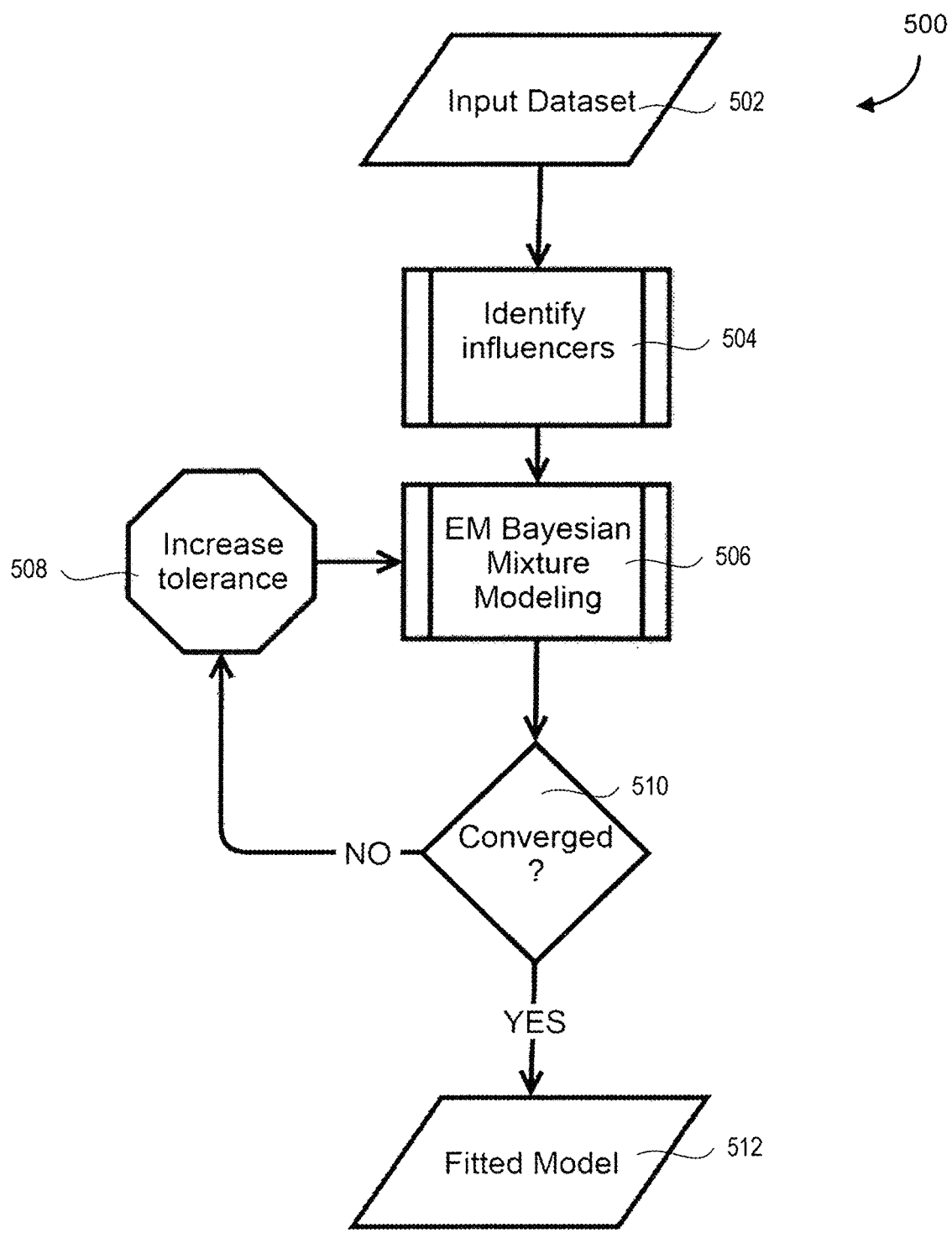
FIG. 5 is an example method diagram showing a modelling approach for assessing virtual machine utilization, according to some embodiments.

FIG. 5 is an example modelling approach for assessing virtual machine utilization, according to some embodiments. Similar to FIG. 4, FIG. 5 is improved upon and described below at FIG. 7. For example, in FIG. 7, an improved convergence rate is found as a "warm" startup is provided through the evenly weighted sum of the Gaussian distributions.

A "warm" starting point provides a fewer number of iterations of the model to fit the input data. The model of FIG. 5 uses effectively the first three data points as an initial startup locations. However, it is not always that the first three data points are representative of the normal operation. The first three data points, in this example, could be outliers, which could lead to a suboptimal start which leads to a longer convergence time.

In an example data center, there may be several thousand (or more) virtual machines, and there may be a large number of data observations, convergence may require several hours, and the improved approach requires a reduced convergence time. In this example, Applicants have estimated that the improved approach significantly decreases the time required for convergence, for example, by a factor of two or more (depending on the data set and the number of observations). In another example, since convergence may be achieved sooner, less computing resources may be required for determining and/or estimating virtual machine underutilization.

To setup the analysis of method 500, the method is configured to identify one or more features that contribute to identification of anomalous virtual machine operations. Influencers are the key fields in the dataset. Data sets are received at 502, and influencers are identified at 504.

An influencer contains information about something that contributes the most to anomalies and the machine learning approach is refined to tune the machine learning model to better establish a constrained set of influencers. After choosing each VM as an influencer, an expectation-maximization (EM) approach at 506 is used to fit a mixture-of-Gaussian models to input data (EM is an iterative method to find the maximum likelihood of parameters in statistical models, where the model depends on unobserved latent variables), iterating until convergence (e.g., if convergence is not achieved at 510, tolerance is increased and the step is run again at 508).

In last step at 512, the difference between historical data and the model's estimates is computed and if it is less than a given tolerance, the fitted model will be returned, otherwise the tolerance will be increased. In other words, the range of estimates coming from the fitted model will increase to meet a certain threshold. It is evident that by increasing the tolerance, estimate accuracy will decrease. In the extreme case, estimates coming from the fitted model could span the whole dataset which makes finding anomalies impossible. One approach to overcome this shortcoming is modifying the modelling process to a specific dataset.

Figure 6:
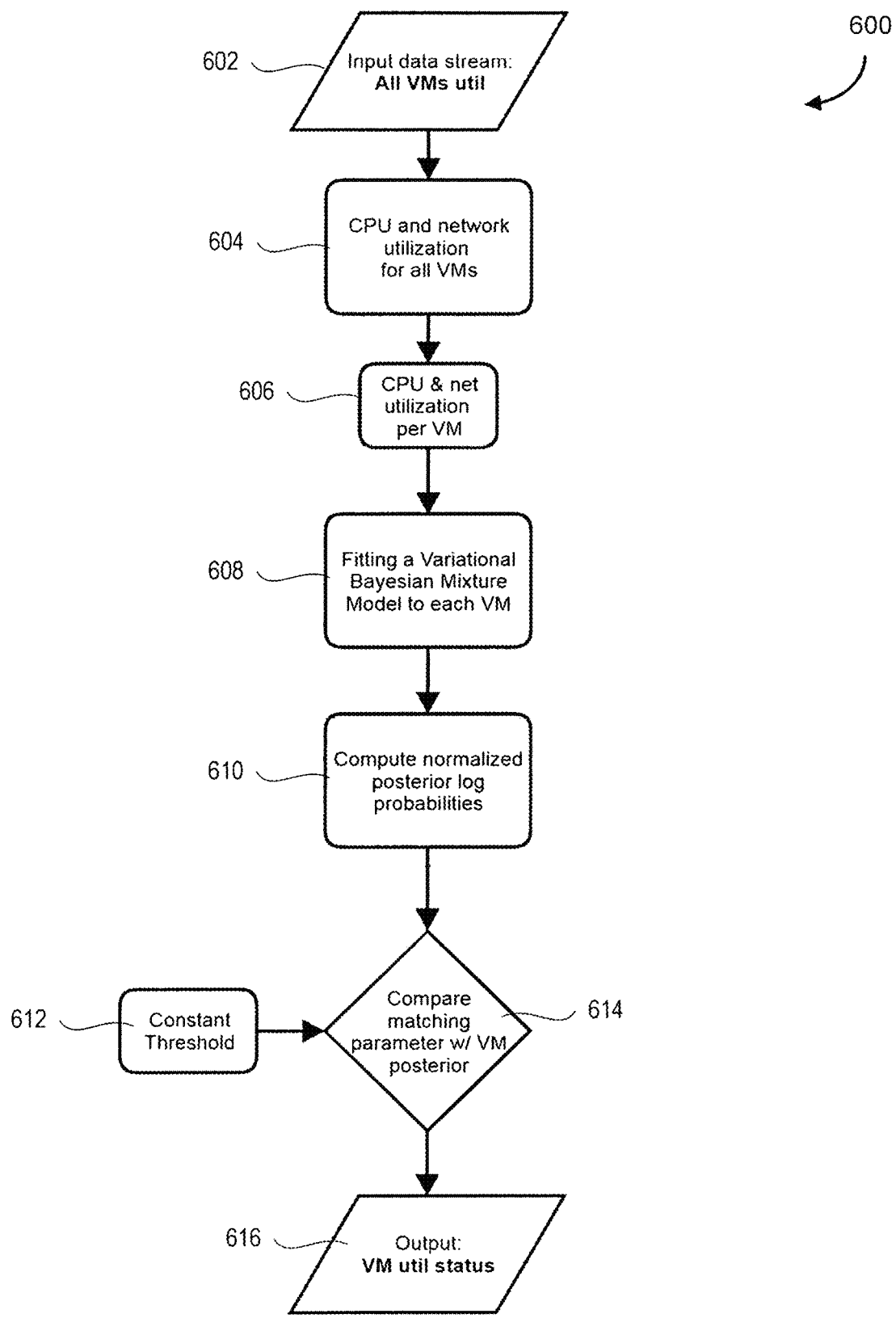
FIG. 6 is an example improved method diagram based on an improved approach, according to various embodiments.

However, this flexibility is not available in the approach of FIG. 4 and this was one of the motives for replacing it with the improved model of FIG. 6. A byproduct of fitting a mixture-of-Gaussian model to this dataset is a similarity score which is assigned to each of the influencer, i.e. virtual machines.

This score shows how similar each virtual machine utilization data is compared to others in the whole environment (dataset). This enables the system, to detect the outliers and generate a list of outliers which can be utilized to modify operating characteristics of the virtual machines.

FIG. 6 is an example improved method based on an improved approach, according to various embodiments. A dataflow is shown at 600, and starts with categorizing data on a per virtual machine basis at 602. A weighted sum of processor and network utilization is computed at 604 and 606, and used as the input for modelling. This aggregated data is pushed to the modelling process shown in FIG. 7 at 608 and a Bayesian Mixture model will be fitted to the aggregated data.

The improved approach, relative to the approach described in the earlier FIG. 4 and FIG. 5, yields improved convergence rates through specific technical modifications of the modelling approach adapted to accentuate specific features derived from the input data, resulting in reduced computation time and processing resources required for machine learning classification.

After comparing the fitted model estimates with actual datapoints, a similarity score is computed by normalizing the posterior log probabilities of each estimate at 610 (e.g., at 610 a number between 0-100 may be generated, which is compared against the constant threshold at 612). Posterior probabilities reflect the uncertainty of assessing an observation (VM utilization) to particular class (VM status). In other words, this normalized numbers show how active each of the VM are. By comparing these numbers with a matching parameter (constant threshold at 612, for example, predefined numbers such as <60, is defined as normal, 60-80 may be defined as a "gray area" that may be subject to post-processing to identify if the assets are oversized, idle, or normal, everything above 80 may be defined as "idle"), the VM status is identified at 616 (e.g., a string indicating normal, oversized, idle).

The thresholding area may be modified, in some embodiments, for increased aggression or conservatism by modifying the pre-defined thresholds. In another embodiment, the thresholds are dynamically modified to identify a specific percentage of virtual machines as idle, oversized, normal, etc.

The improved approach provides the following extra parameters for fine tuning the models. Note that all of these parameters were predefined and fixed in the modelling process of FIG. 5.

1. Number of components in the Mixture Bayesian Model (s)
2. Covariance type of the Mixture Bayesian Models
3. Prior distribution weights, means, and covariance
4. Matching parameter (a constant threshold that alter the model aggressiveness)

Figure 7:
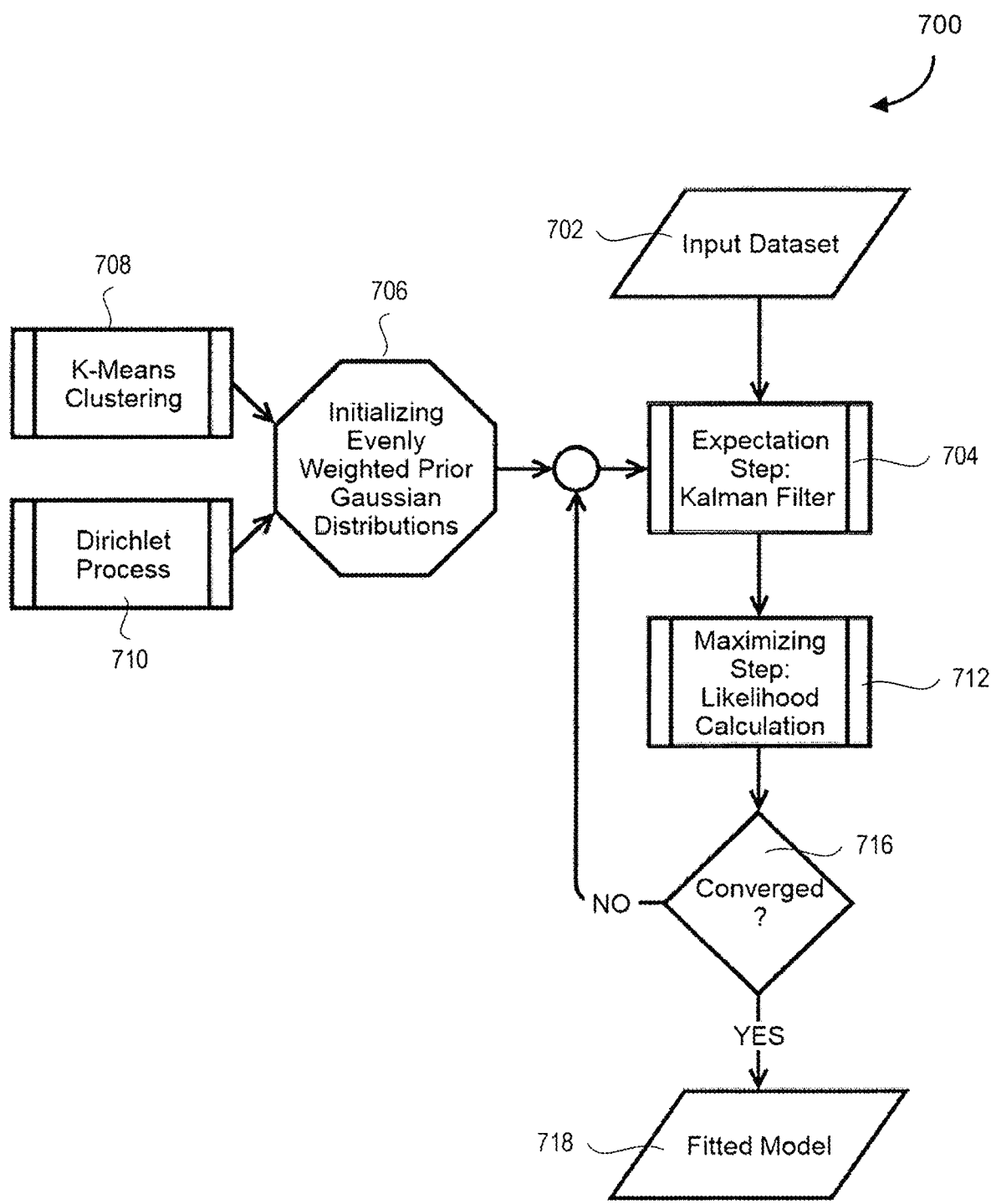
FIG. 7 is an improved developed method for establishing models, according to some embodiments.
Figures 9A, 9B:
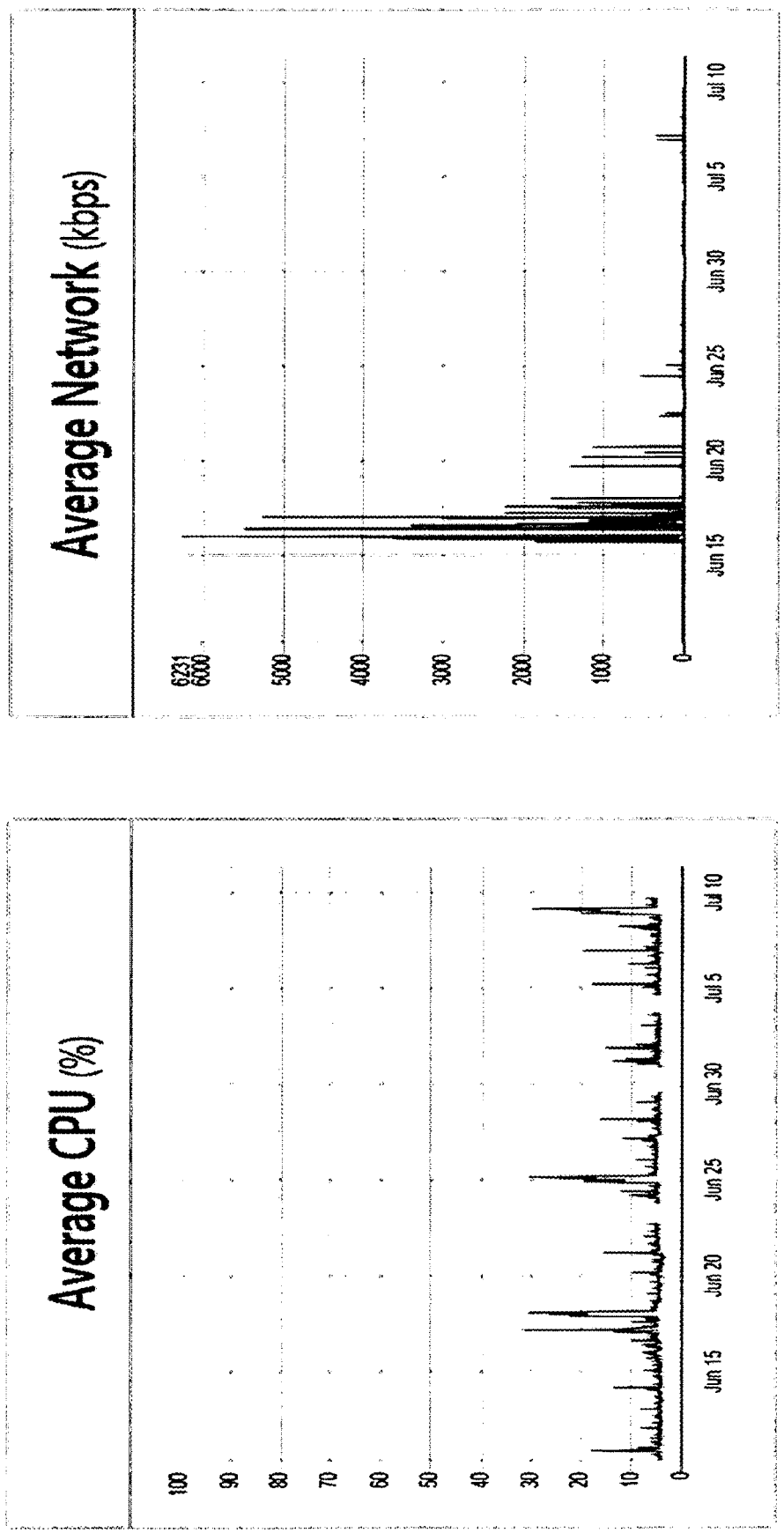
FIG. 9A is a graph showing average CPU usage for a normal (e.g., regularly utilized) virtual machine utilization, according to some embodiments.
FIG. 9B is a graph showing average CPU usage for a normal virtual machine utilization, according to some embodiments.

At FIG. 7, an improved approach for establishing models is provided, according to some embodiments. The approach is an improvement that extended the modeling process of FIG. 5 by adding two modifiable choices for generating the initial models. Moreover, a matching parameter is introduced to control the aggressiveness of machine learning approach. This parameter is a constant threshold that draws the line for classification. In other words, by increasing the matching parameter, model will try to fit data more closely.

Hence, a larger number of idle virtual machines will be identified and higher accuracy is achieved.

Relative to FIG. 5, the random initialization has been replaced with evenly weighted prior Gaussian distributions at 706. This decreases the iteration of the EM approach since the initial model have the same distribution as the final fitted model and the fitting model is initialized with more accurate datasets. A Kalman filter is used for the expectation-maximization approach at 704, based on the input data set (702). Other approaches are possible for expectation-maximization, and embodiments are not limited to only Kalman filters.

Two options are provided to determine these initial Gaussian distributions at 706.

The first option for initializing the prior Gaussians at 708 is a K-mean clustering which aims to partition all utilization data into two clusters of idle, and normal. Using K-mean clustering will shift each observation to the cluster with the nearest mean, serving as a prototype of the cluster. After classifying the data into proper categories, the mixture of Gaussian distributions are initialized and ready to push into the EM mechanism.

The second option for initializing the prior Gaussians at 710 is Dirichlet Process (DP). DP is a probability distribution whose range is itself a set of probability distributions. It is used in Bayesian inference to describe the prior knowledge about the distribution of random variable, i.e. how likely it is that the random variables are distributed according to one or another particular distribution.

Therefore, it is a useful candidate when datapoints are assumed to be distributed in a hierarchical fashion and each datapoint belongs to only one cluster and the members of the cluster are further distributed randomly within that cluster. Maximization is conducted through a determination of likelihood at 712, which is iterated until convergence at 716 to produce a fitted model at 718.

Taking advantage of DP for initializing the prior distributions will result into more accurate priors and therefore more accurate models with faster convergence rate. Faster convergence rates are achieved because of the decrease in EM method iterations.

In some embodiments, parallel approaches are initiated using both the first option at one instance and using the second option at another instance, and having the two instances compete against one another. The approach that first yields a convergence may be selected, in accordance with a preferred embodiment. While the approach of using two competing parallel approaches may be more costly from a processing perspective, the competing approaches may yield faster convergence, allowing the processing to be completed in a shorter period of time.

The model is utilized to generate a data structure storing virtual machine instances as one data field, alongside a utilization score (or an integer/string representing the utilization status) generated by the system. The data structure may be ranked such that a higher scored virtual machine instance may be provided at the top of the data structure, such that when the data structure is traversed by a hypervisor controller for modifying resource allocation and provisioning, the virtual machines are reviewed from highest score to lowest score.

In some embodiments, a virtual computing platform controller is provided that is especially configured to control how the virtual machines are provisioned based on the classifications generated by the system. In particular, as virtual machines are identified as idle or normal usage, control signals are generated to modify how the idle virtual machines are operated, for example, by a hypervisor. The order in which the data structure maintains the virtual machine scores may be utilized by the hypervisor in determining an order in which automatic actions are taken by the hypervisor to reduce virtual machine usage.

Control signals may be transmitted and encapsulated identifying the virtual machines (e.g., the idle virtual machines) whose resources should be reduced and reallocated to other virtual machines (e.g., normal virtual machines) to re-balance resource distribution. In another embodiment, the control signals are configured to initiate consolidation by the hypervisor of a first virtual computing platform classified as low utilization and a second virtual computing platform classified as low utilization to a single virtual computing platform, so that a single virtual machine may be used for the same operation. Two or more virtual machines may be consolidated together.

Referring to FIG. 8A-FIG. 13B, an illustrative example is provided of some embodiments in operation. Two VMs with idle and normal status with their network and CPU utilization depicted in FIG. 8A and FIG. 8B, and FIG. 9A and FIG. 9B, respectively.

Figure 10:
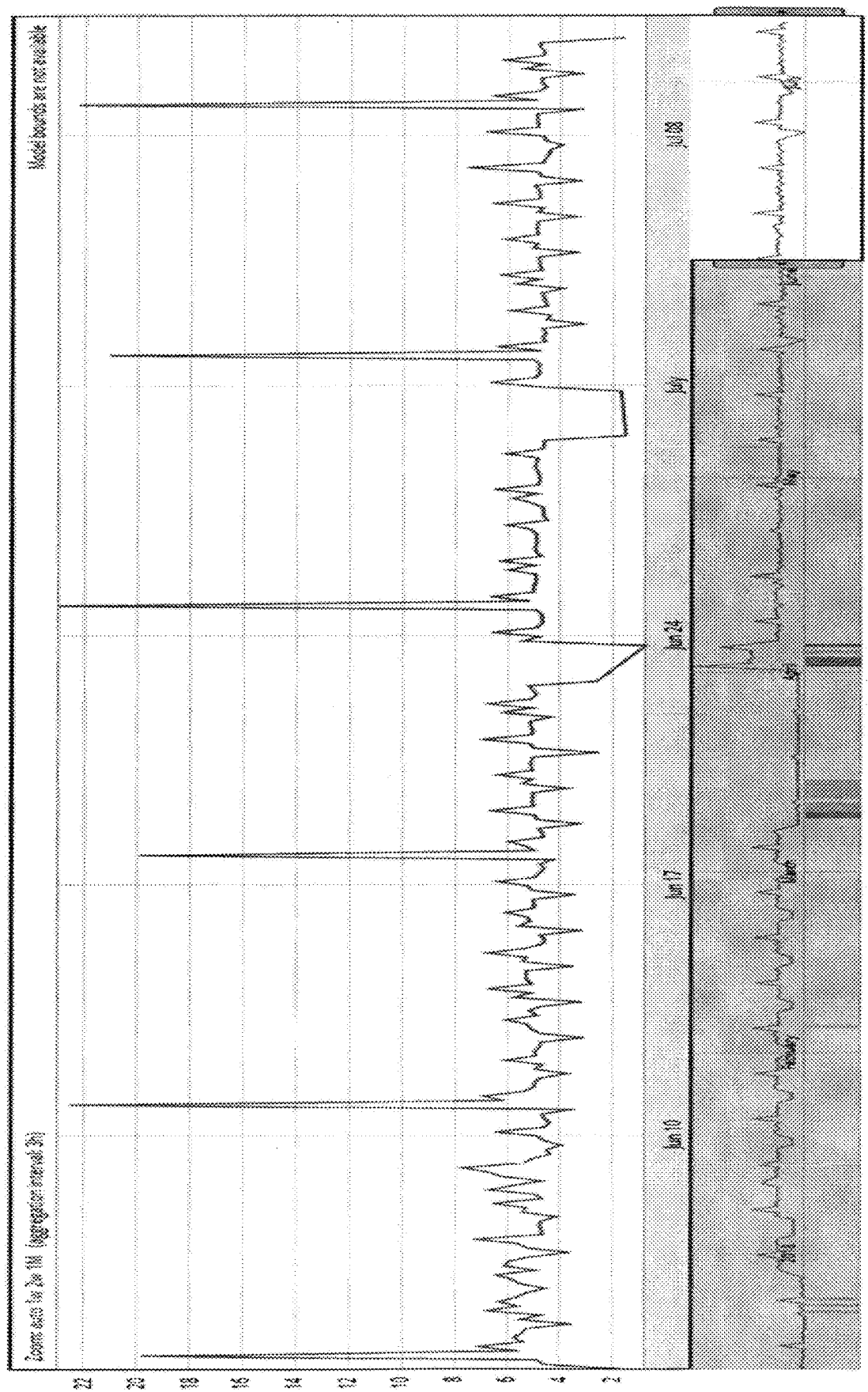
FIG. 10 is a graph showing the weighted sum of CPU and network utilization for an idle virtual machine, according to some embodiments.
Figure 11:
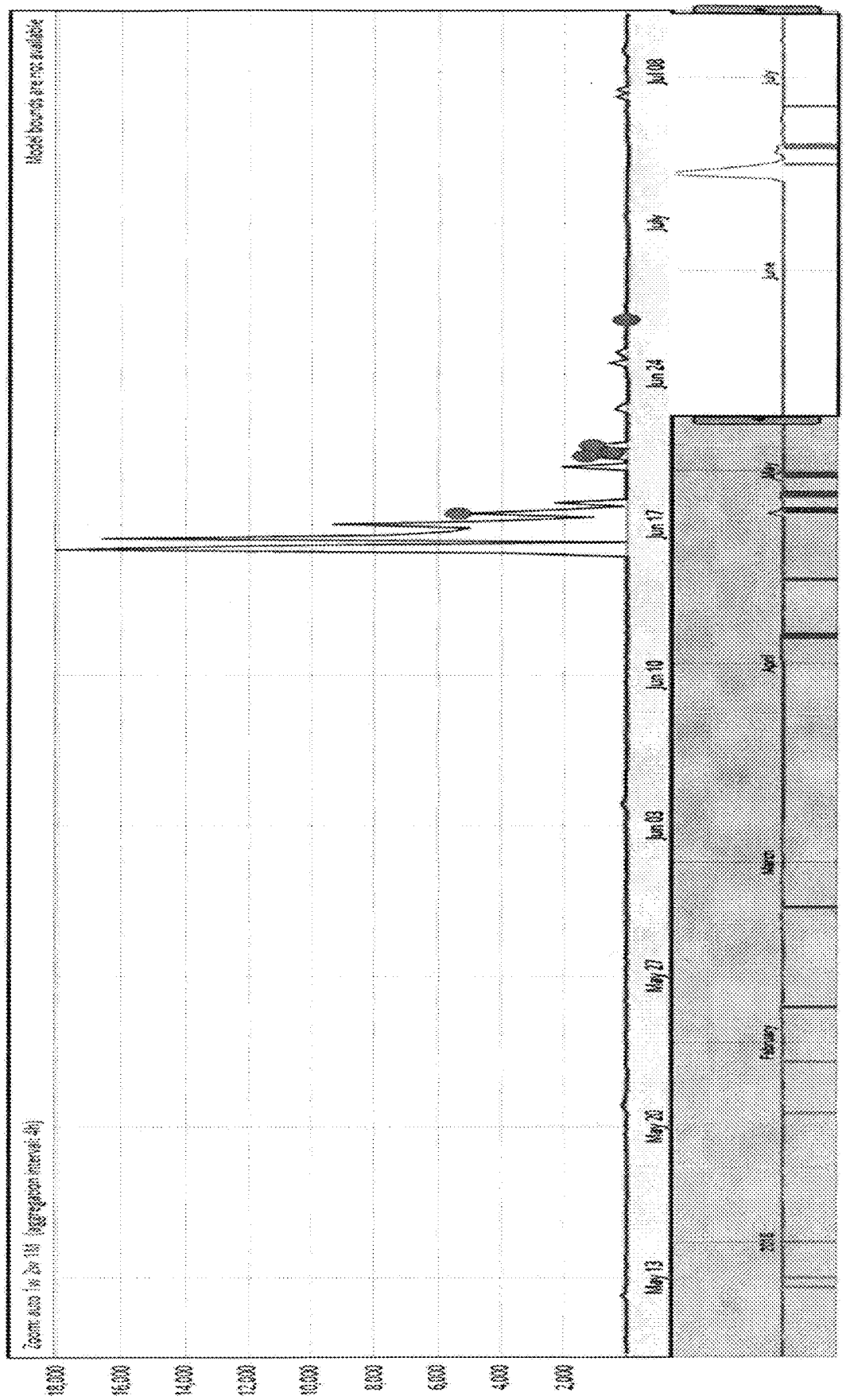
FIG. 11 is a graph showing the weighted sum of CPU and network utilization for a normal virtual machine, according to some embodiments.
Figure 13A:
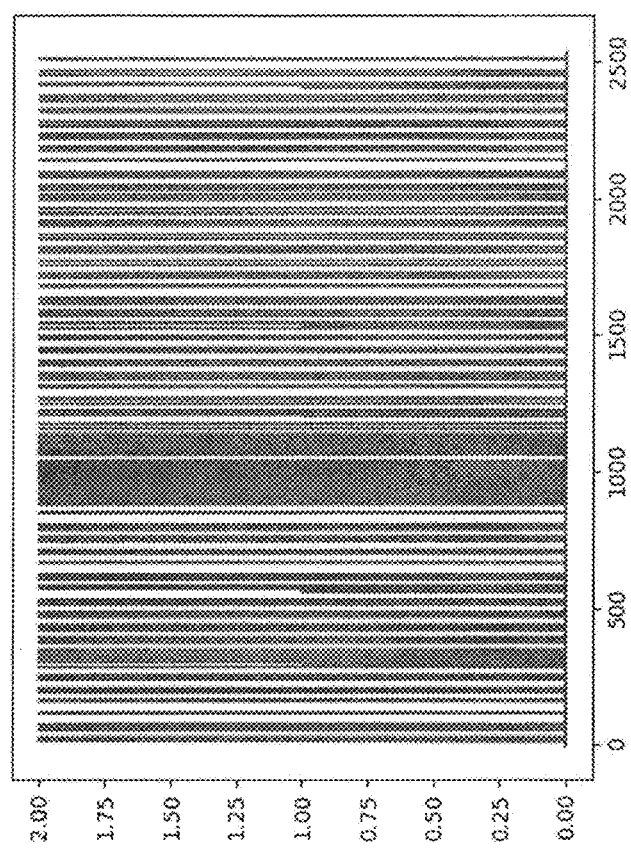
FIG. 13A is a graph showing a modified weighted sum of CPU and network utilization for the normal virtual machine for processing in accordance with an embodiment of the improved approach after processing through the improved model fitting approach.
Figure 13B:
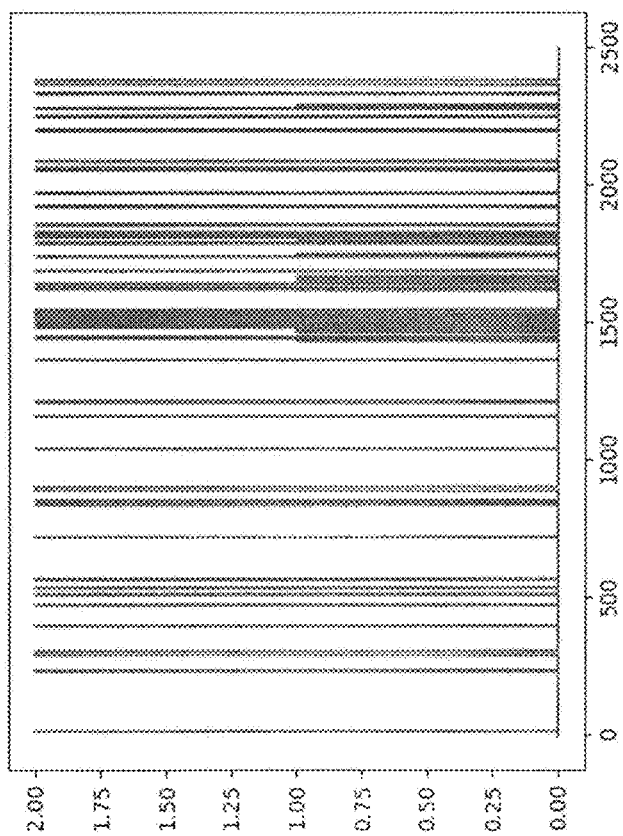
FIG. 13B is a graph showing a modified weighted sum of CPU and network utilization for the idle virtual machine for processing in accordance with an embodiment of the improved approach after processing through the improved model fitting approach.

In the ML approach of FIG. 4 and FIG. 5, these data are provided into the system and prior to defining the ML operation, a weighted sum (the number is unit-less—it is a combination of percentages, the weighted average is established based on the weighted average of percentages, the weights determined experimentally or based on a feedback loop based on threshold modifications) of network and CPU will be determined as illustrated in FIG. 10, and FIG. 11. Specific weights include 75% CPU and 25% network, but other weights are possible and these are provided as illustrative non-limiting examples (e.g., variation is possible).

The next step is to define the ML operation, i.e. setting virtual machines as influencers (e.g., aspects in the data set that influence the data set most; entities that are responsible for anomalous behavior). In the example of FIG. 4 and FIG. 5, specific virtual machine instances are defined as influencers—e.g., this virtual machine is X % different than another.

A mixture-Gaussian model is then be fitted to each virtual machine utilization data set (weighted sum of CPU and network) and an anomaly score is determined for each VM. This process is conducted after running the ML operation and there is no way to dig into more details or modify any underlying parameters. The final result of this process will be anomaly score of 4.54 for idle virtual machine and 0.08 for the normal virtual machine.

Therefore, the idle virtual machine will be flagged for going through the post processing.

Referring to the improved modelling and computational approach of FIG. 6 and FIG. 7, similarly, the same two virtual machines with utilization plotted in FIG. 8A and FIG. 8B, and FIG. 9A and FIG. 9B are picked for feeding into the improved ML algorithm. Each virtual machine is reviewed separately from others, and is compared against its own observation data. A score is generated for each virtual machine individual of the others, which is then processed in aggregate with the virtual machine against the virtual machines of the environment and the scores are then normalized (e.g., to further emphasize outliers).

The output recommendation for VM utilization status is expected to be the same as results for FIG. 4 and FIG. 5. While the model underlying parameters are not reachable in the example approach of FIG. 4 and FIG. 5, the improved approach of FIG. 6 and FIG. 7 is tailored with the aid of the extra adjustable features.

To start with, the approach has modified the weighted sum in a way to provide more accurate recommendations. The new weighted coefficients are optimized based on the comparison between FIG. 4/FIG. 5 operational results and estimates from the improved approach of FIG. 6/FIG. 7. The re-calculated coefficients are then used to prepare the utilization data for the modelling process. FIG. 12A and FIG. 12B show the input utilization data for the modelling approach of FIG. 6/FIG. 7.

Comparing FIG. 12A and FIG. 12B (e.g., X axis is an epoch time, Y axis is a unit-less summation) with those of FIG. 10, and FIG. 11 confirms that while the weighted sum in the approach of FIG. 6/FIG. 7 is similar to the weighted sum from FIG. 4/FIG. 5, the peaks are more accentuated which will facilitate the fitting process and decrease the convergence rate, which means that it is more sensitive to identify outliers (e.g., a larger score is assigned to outliers). Then by pushing the data depicted in FIG. 12A and FIG. 12B to the FIG. 6/FIG. 7 approach described above, the estimates for each VM are thus provided at FIG. 13A and FIG. 13B.

Computing the log posterior probabilities for both virtual machines will lead to anomaly score of 4.22 for the idle virtual machine and 0.11 for the normal virtual machine which are almost the same as the FIG. 4/FIG. 5 scores. Hence, the FIG. 6/FIG. 7 process have provided the same result in this case and a bit more accurate overall estimates while it is more flexible. However, the improved process of FIG. 6/FIG. 7 yielded a faster convergence time during experimentation by Applicant. Accordingly, a technical improvement is an increased ability to obtain convergence earlier, thus saving computational cycles required for identification of virtual machine underutilization status, which becomes a major driver for efficiency when assessing very large numbers of virtual machine instances.

The re-allocation and resizing opportunities, in some embodiments, is provided in the form of a graphical user interface having interface elements, which when selected by an administrator user, causes the initiation of right-sizing operations by the hypervisor. In some embodiments, the automatic re-sizing and de-provisioning of virtual machines is conducted on virtual machines identified as non-critical, such as test environments or pre-production environments, reclaiming resources that are identified as being underutilized. From a practical perspective, data center resource requirements are reduced and accordingly, there are increased cost savings and reduced technological footprint required.

Embodiments of methods, systems, and apparatus are described through reference to the drawings.

The preceding discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Numerous references are made herein regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer implemented system for detecting suboptimal performance of one or more virtual computing platforms, each corresponding to a data source of one or more data sources, the system comprising:
   a classification computing node configured to process usage data and performance data from the one or more data sources to produce a utilization data value and a classification for each data source of the one or more data sources and store the utilization data value and the classification in a memory, the classification node comprising:
      a feature detection engine for detecting, collecting, interpreting, and quantifying features of the usage data and the performance data and storing the features in a memory, the features representing key fields in the usage data and the performance data;
      a scoring engine for producing the utilization data value for each data source the one or more data sources corresponding to each virtual computing platform based on at least one of the features stored in the memory, and storing the utilization data value in the memory; and
      a classification engine assigning an assigned classification to each data source of the one or more data sources based on the utilization data value stored in the memory;
   wherein the utilization data value is generated by providing the features of the usage data and the performance data as inputs into a machine learning computing model for fitting the usage data and performance data in accordance with a Variational Bayesian Mixture model to generate one or more fitted model estimates;
   wherein the one or more fitted model estimates are used to establish one or more corresponding similarity scores generated by normalizing posterior log probabilities corresponding to each of the one or more fitted model estimates, the posterior log probabilities reflecting an uncertainty of virtual computing platform utilization observations with the corresponding classification; and
   wherein the assigned classification for each data source of the one or more data sources is based at least on at least one of the established one or more similarity scores.

2. The system of claim 1, wherein the machine learning computing model includes a first expectation maximization step using a Kalman filter initialized with evenly weighted prior Gaussian distributions.

3. The system of claim 2, wherein the evenly weighted prior Gaussian distributions are generated using K-mean clustering approaches to shift observations to a nearest mean to establish a prototype cluster within the observations.

4. The system of claim 2, wherein the evenly weighted prior Gaussian distributions are generated using a Dirichlet Process, a probability distribution whose range is itself a set of probability distributions.

5. The system of claim 2, wherein the machine learning computing model is initialized by iteratively conducting the expectation maximization step until convergence upon a constrained set of parameters that are identified as influencers within the set of all parameters within the usage data and the performance data.

6. The system of claim 5, wherein the scoring engine for producing the utilization data value is configured to generate the utilization data value by providing the features of the usage data and the performance data as inputs into the initialized machine learning computing model for fitting the usage data and the performance data in accordance with a Variational Bayesian Mixture model to generate one or more fitted model estimates.

7. The system of claim 6, wherein the normalized posterior log probabilities representing a level of activity of the corresponding virtual computing platform.

8. The system of claim 7, wherein the classification engine is configured to compare the normalized posterior log probabilities against a constant threshold to establish one or more classified virtual computing platform statuses, each corresponding to a virtual computing platform of the one or more virtual computing platforms.

9. The system of claim 8, comprising a virtual computing platform controller configured to transmit one or more control signals to a hypervisor, the one or more control signals configured to initiate re-allocation of resources by the hypervisor from a first virtual computing platform classified as low utilization to a second virtual computing platform classified as high utilization.

10. The system of claim 8, comprising a virtual computing platform controller configured to transmit one or more control signals to a hypervisor, the one or more control signals configured to initiate consolidation by the hypervisor of a first virtual computing platform classified as low utilization and a second virtual computing platform classified as low utilization to a single virtual computing platform.

11. A computer implemented method for detecting sub-optimal performance of one or more virtual computing platforms, each corresponding to a data source of one or more data sources, the method comprising:

receiving usage data and performance data associated with the one or more virtual computing platforms;

detecting, collecting, interpreting, and quantifying features of the usage data and the performance data and storing the features in a memory, the features representing key fields in the usage data and the performance data;

producing one or more utilization data values corresponding to each virtual computing platform of the one or more virtual computing platforms based on at least one of the features stored in the memory, and storing the utilization data value in the memory;

assigning the one or more virtual computing platforms an assigned classification of the one or more classifications based on a corresponding utilization data value of the one or more utilization data values;

wherein the one or more utilization data values are generated by providing the features of the usage data and the performance data as inputs into a machine learning computing model for fitting the usage data and performance data in accordance with a Variational Bayesian Mixture model to generate one or more fitted model estimates;

wherein the one or more fitted model estimates are used to establish one or more corresponding similarity scores generated by normalizing posterior log probabilities corresponding to each of the one or more fitted model estimates, the posterior log probabilities reflecting an uncertainty of virtual computing platform utilization observations with the corresponding classification; and wherein the assigned classification for each data source of the one or more data sources is based at least on at least one of the established one or more similarity scores.

12. The method of claim 11, wherein the evenly weighted prior Gaussian distributions are generated using K-mean clustering approaches to shift observations to a nearest mean to establish a prototype cluster within the observations.

13. The system of claim 11, wherein the evenly weighted prior Gaussian distributions are generated using a Dirichlet Process, a probability distribution whose range is itself a set of probability distributions.

14. The system of claim 11, wherein the machine learning computing model is initialized by iteratively conducting the expectation maximization step until convergence upon a constrained set of parameters that are identified as influencers within the set of all parameters within the usage data and the performance data.

15. The system of claim 14, wherein the one or more utilization data values are generated by providing the features of the usage data and the performance data as inputs into the initialized machine learning computing model, fitting the usage data and performance data in accordance with a Variational Bayesian Mixture model to generate one or more fitted model estimates.

16. The system of claim 15, wherein the normalized posterior log probabilities represent a level of activity of the corresponding virtual computing platform.

17. The system of claim 16, comprising comparing the normalized posterior log probabilities against a constant threshold to establish one or more classified virtual computing platform statuses, each corresponding to a virtual computing platform of the one or more virtual computing platforms.

18. The system of claim 17, comprising transmitting one or more control signals to a hypervisor, the one or more control signals configured to initiate re-allocation of resources by the hypervisor from a first virtual computing platform classified as low utilization to a second virtual computing platform classified as high utilization.

19. The system of claim 17, comprising transmitting one or more control signals to a hypervisor, the one or more control signals configured to initiate consolidation by the hypervisor of a first virtual computing platform classified as low utilization and a second virtual computing platform classified as low utilization to a single virtual computing platform.

20. A non-transitory computer readable medium storing a set of machine-interpretable instructions, which when executed, cause a processor to perform steps of a method for detecting sub-optimal performance of one or more virtual computing platforms, each corresponding to a data source of one or more data sources, the method comprising:

receiving usage data and performance data associated with the one or more virtual computing platforms;

detecting, collecting, interpreting, and quantifying features of the usage data and the performance data and storing the features in a memory, the features representing key fields in the usage data and the performance data;

producing one or more utilization data values corresponding to each virtual computing platform of the one or more virtual computing platforms based on at least one of the features stored in the memory, and storing the utilization data value in the memory;

assigning the one or more virtual computing platforms an assigned classification of the one or more classifications based on a corresponding utilization data value of the one or more utilization data values;

wherein the one or more utilization data values are generated by providing the features of the usage data and the performance data as inputs into a machine learning computing model for fitting the usage data and performance data in accordance with a Variational Bayesian Mixture model to generate one or more fitted model estimates; and wherein the one or more fitted model estimates are used to establish one or more corresponding similarity scores generated by normalizing posterior log probabilities corresponding to each of the one or more fitted model estimates, the posterior log probabilities reflecting an uncertainty of virtual computing platform utilization observations with the corresponding classification; and wherein the assigned classification for each data source of the one or more data sources is based at least on at least one of the established one or more similarity scores.

* * * * *